(12) United States Patent
De Beer et al.

(10) Patent No.: US 10,360,633 B2
(45) Date of Patent: Jul. 23, 2019

(54) SECURE MESSAGING SYSTEMS, METHODS, AND AUTOMATION

(71) Applicant: BrightPlan LLC, Los Gatos, CA (US)

(72) Inventors: Marthin De Beer, Los Gatos, CA (US); Krutarth Shah, Pleasanton, CA (US); Larry Robinson, Lafayette, CA (US)

(73) Assignee: BrightPlan LLC, Los Gatos, CA (US)

( * ) Notice: Subject to any disclaimer, the term of this patent is extended or adjusted under 35 U.S.C. 154(b) by 0 days.

(21) Appl. No.: 15/796,622

(22) Filed: Oct. 27, 2017

(65) Prior Publication Data

US 2019/0130487 A1     May 2, 2019

(51) Int. Cl.
*G06Q 40/06* (2012.01)
*H04L 29/08* (2006.01)
(Continued)

(52) U.S. Cl.
CPC ......... *G06Q 40/06* (2013.01); *G06F 16/9574* (2019.01); *G06Q 40/00* (2013.01); *H04L 9/3213* (2013.01); *H04L 43/18* (2013.01); *H04L 67/02* (2013.01); *H04L 67/22* (2013.01); *H04L 67/306* (2013.01)

(58) Field of Classification Search
CPC ... G06Q 40/06; G06Q 40/00; G06F 17/30902
See application file for complete search history.

(56) References Cited

U.S. PATENT DOCUMENTS

| | | | |
|---|---|---|---|
| 8,510,198 B2* | 8/2013 | Kmak | G06Q 40/06 705/35 |
| 8,768,800 B2* | 7/2014 | Milosavljevic | G06Q 40/00 705/37 |

(Continued)

FOREIGN PATENT DOCUMENTS

| | | |
|---|---|---|
| WO | WO2019083779 A1 | 5/2019 |
| WO | WO2019083786 A1 | 5/2019 |

OTHER PUBLICATIONS

Pejman Dashtinejad, Security System for Mobile Messaging Applications, Jan. 8, 2015, KTH University, web edition, 1-31 (Year: 2015).*

(Continued)

*Primary Examiner* — I Jung Liu
(74) *Attorney, Agent, or Firm* — Carr & Ferrell LLP

(57) ABSTRACT

Systems and methods for secure messaging and automation are disclosed herein. An example method includes providing a user-facing application secured through use of a security token cached on a web browser, establishing a security protocol or security token utilized between the application server layer and the web services layer that is different from the security token cached on the web browser; and performing asynchronous processing based on user interaction with a goal-based planning application that provides queries that are directed to assessing both risk willingness and goal ability, generates a risk willingness score and a goal ability score, selects a goal-based plan, and generating one or more instructions sets that are used to automatically reconfigure the plurality of user accounts to ensure that a goal is met within a specified time frame.

17 Claims, 14 Drawing Sheets

(51) Int. Cl.
    *H04L 9/32*           (2006.01)
    *H04L 12/26*         (2006.01)
    *G06F 16/957*       (2019.01)
    *G06Q 40/00*        (2012.01)

(56) References Cited

U.S. PATENT DOCUMENTS

| | | |
|---|---|---|
| 2003/0110117 A1 | 6/2003 | Saidenberg et al. |
| 2003/0204460 A1 | 10/2003 | Robinson et al. |
| 2004/0054610 A1 | 3/2004 | Amstutz et al. |
| 2011/0083176 A1 | 4/2011 | Martynenko et al. |
| 2012/0041991 A1 | 2/2012 | Shrufi et al. |
| 2012/0131660 A1 | 5/2012 | Dalzell et al. |
| 2016/0117773 A1 | 4/2016 | Lin et al. |
| 2017/0206352 A1 | 7/2017 | Brech et al. |
| 2019/0132293 A1 | 5/2019 | De Beer et al. |

OTHER PUBLICATIONS

"International Search Report" and "Written Opinion of the International Searching Authority," Patent Cooperation Treaty Application No. PCT/US2018/056211, dated Dec. 27, 2018, 9 pages.
Kitces, Michael, "Kitces: The Risks of Simplifying Risk," Mar. 19, 2017, Retrieved from the Internet: <URL:https://www.financial-planning.com/news/kitces-the-risks-of-simplfying-risk>, 8 pages.
"International Search Report" and "Written Opinion of the International Searching Authority," Patent Cooperation Treaty Application No. PCT/US2018/056132, dated Jan. 3, 2019, 11 pages.
Haigh, Karen Zita, et al., "Interleaving Planning and Robot Execution for Asynchronous User Requests," in Autonomous Agents, Feb. 1997 [online], Retrieved from the Internet: <URL:https://www.ri.cmu.edu/pub_files/pub1/haigh_karen_zita_1996_4/haigh_karen_zita_1996_4.pdf>, 19 pages.

\* cited by examiner

BrightPlan Application {200}

| Dynamic Goal Model Selection | Content Recommendations | Goal and Action Recommendations | Cohort Analysis and Recommendations | Automated Investing | Automated Custodial Accounts {208} |
|---|---|---|---|---|---|
| • Combine Goal Parameters and profile to determine model portfolio for goal<br>• Monitor goal and adjust as goal parameters evolve<br>• Re-evaluate goals (MCS) daily/weekly to determine status | • Analyze content by tags and map to Client Profile and Goals<br>• Suggest and surface relevant content for a user<br>• Train a predictive engine to fine tune the recommendation for best content | • Recommend Actions for a client based on profile and goals<br>• Recommend goals based on profile and financial plan<br>• Predict most likely next goal | • Analyse all client profiles and financial plans in abstract to determine best practice by demographic<br>• Leverage cohort analysis to make recommendation to clients - budgeting, saving, planning<br>• Assign badges and benchmarks to clients comparing with similar clients | • Use dynamic model selection for the right investment strategy by goal<br>• Automate saving by goal through ACH deposits<br>• Rebalance models monthly to strategy<br>• TLH at the tax lot level as appropriate<br>• Aggregate all accounts into a net-worth financial dashboard | • Account opening process<br>• Account funding<br>• Reporting all transactions<br>• Integrate with PMS for performance and reconcilliation |

| Goal Planners | Investment Services | Content | Account Reporting | Account Aggregation | Notifications | Client Profile {206} |
|---|---|---|---|---|---|---|

Security

Predicitive Analytics / Machine Learning {204}

| Salesforce | Heroku App Services | VEO | IREBEL | Docusign | ASI | Yodlee |
|---|---|---|---|---|---|---|

| Questions | Answer | Weight | Score for each response | Weighted Score | Question Category | Test Column Brian INPUTS | Locked Formula |
|---|---|---|---|---|---|---|---|
| Goal Ability | | | | | | | |
| Goal Timeframe | <= 1year | 40% | 0 | 0 | | | |
| | 1-< 4years | | 25 | 10 | | | |
| >3 &<6 | >=4- <6years | | 50 | 20 | | | |
| | >=6- <10years | | 75 | 30 | | | |
| | >=10years | | 100 | 40 | | Y | 40 |
| Withdraw Timeframe | Immediate - in one go | 30% | 0 | 0 | | Y | 0 |
| | 1-<4years | | 25 | 7.5 | | | |
| | >=-<6years | | 50 | 15 | | | |
| | >=6-<10years | | 75 | 22.5 | | | |
| | >=10years | | 100 | 30 | | | |
| Age - the younger you are, the longer you have to earn your way out of a draw down | 18-40 | 15% | 100 | 15 | | | |
| | 41-50 | | 75 | 11.25 | | | |
| | 51-60 | | 50 | 7.5 | | Y | 7.5 |
| | 61-70 | | 25 | 3.75 | | | |
| | 71-80 | | 10 | 1.5 | | | |
| Liquid Net Worth | >1M | 15% | 100 | 15 | | | |
| Liquid net worth excludes home equity | >$500K-<=$1M | | 75 | 11.25 | | Y | 11.5 |
| | >$250K-<=$500K | | 50 | 7.5 | | | |
| | >$100K-<=$250K | | 25 | 3.75 | | | |
| | >$100K | | 0 | 0 | | | |
| Total | | | Min | 1.5 | | | 50 |
| | | | Max | 100 | | | 58.75 |
| Risk Tolerance | | | | | | | |
| How would you describe your knowledge of investing? | None, I am new to investing | 25% | 0 | 0 | Experience | | |
| | Limited, I have some basic understanding | | 33 | 8.25 | | | |
| | Good, I have a good overall understanding of most types of investing strategies | | 66 | 16.5 | | | |
| | Extensive, I have deep and broad knowledge of all types of investing strategies | | 100 | 25 | | Y | 25 |
| What is your approach to saving and investing | | 25% | | | Strategy | | |

FIG. 5A

| | | | | | |
|---|---|---|---|---|---|
| Assuming a hypothetical $100K portfolio, which one-year performance range would you prefer? | I am willing to make big bets to have a chance to win big<br><br>A: 115,500: 104,400: 90,000<br>B: 124,600: 105,600: 83,900<br>C: 130,400: 106,400: 79,200<br>D: 138,800: 107,500: 73,200<br>E: 146,700: 108,400: 67,700 | 25% | 100<br><br>0<br>25<br>50<br>75<br>100 | 100<br><br>0<br>6.25<br>12.5<br>18.75<br>25 | 25<br><br>Returns | Y | 18.75 |
| Imagine that in the past 3 months, your investments lost 20% in value, assuming you still had 10 years before you need the funds, how do you react? | One Quarter? Who cares! I would consider buying more. | 25% | 100 | 25 | Reaction to negative | Y | 25 |
| | I wouldn't worry about losses in that timeframe and would just stick with my investment strategy. | | 75 | 18.75 | | | |
| | I would only be moderately concerned and will review my investment options again. | | 50 | 12.5 | | | |
| | I can only tolerate small short term losses and would consider selling investments. | | 25 | 6.25 | | | |
| | I would panic and would probably sell all my investments. | | 0 | 0 | | | |
| Total | | | Min<br>Max | 0<br>100 | | | 0<br>85<br>87.5 |

SECURE MESSAGING SYSTEMS, METHODS, AND AUTOMATION

FIELD OF THE TECHNOLOGY

The present technology relates generally to secure messaging, and more particularly, but not by limitation, to systems and methods for secure messaging that allow modular subsystem isolation, as well as latency remediation and improved user experiences. Some embodiments allow for creating and dynamically reallocating user accounts or assets based on empirical data analysis, modeling, and so forth.

SUMMARY OF THE PRESENT TECHNOLOGY

According to some embodiments, the present disclosure is directed to a secure messaging system, comprising: (a) a data retention and predictive analytics systems, both of which are in secure isolation from a remainder of the secure messaging system; (b) a web services layer providing access to the data retention and predictive analytics systems; (c) an application server layer that: (d) provides a user-facing application that accesses the data retention and predictive analytics systems through the web services layer, the user-facing application being secured through use of a security token cached on a web browser that provides the user-facing application; and (e) performs asynchronous processing based on user interaction with a goal-based planning application that processes data from a plurality of user accounts, wherein the goal-based planning application is capable of: (i) providing queries that are directed to assessing both risk willingness and goal ability; (ii) receiving responses to the queries; (iii) generating a risk willingness score and a goal ability score; (iv) selecting an investment plan based on both the risk willingness score and the goal ability score; and (v) generating one or more instructions sets that are used to automatically reconfigure the plurality of user accounts to ensure that the investment plan is executed to meet a goal within a specified time frame.

According to some embodiments, the present disclosure is directed to a method, comprising: (a) providing, by an application server layer, a user-facing application that accesses a data retention and predictive analytics systems through a web services layer, the user-facing application being secured through use of a security token cached on a web browser that provides the user-facing application; establishing a security protocol or security token utilized between the application server layer and the web services layer that is different from the security token cached on the web browser; and performing asynchronous processing based on user interaction with a goal-based planning application that processes data from a plurality of user accounts, wherein the goal-based planning application is capable of: (i) providing queries that are directed to assessing both risk willingness and goal ability; (ii) receiving responses to the queries; (iii) generating a risk willingness score and a goal ability score; (iv) selecting an investment plan based on both the risk willingness score and the goal ability score; and (v) generating one or more instructions sets that are used to automatically reconfigure the plurality of user accounts to ensure that the investment plan is executed to meet a goal within a specified time frame.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 2 is a schematic layer diagram of an example system constructed in accordance with the present disclosure.

FIGS. 5A-5B collectively illustrate an example query strategy that is used by the systems of the present disclosure in determining risk willingness and goal ability.

FIG. 10 is a screenshot of a general overview dashboard provided by a user-facing application.

FIG. 11 is a screenshot of a goal summary dashboard UI provided by a user-facing application.

DETAILED DESCRIPTION

Figure 1:
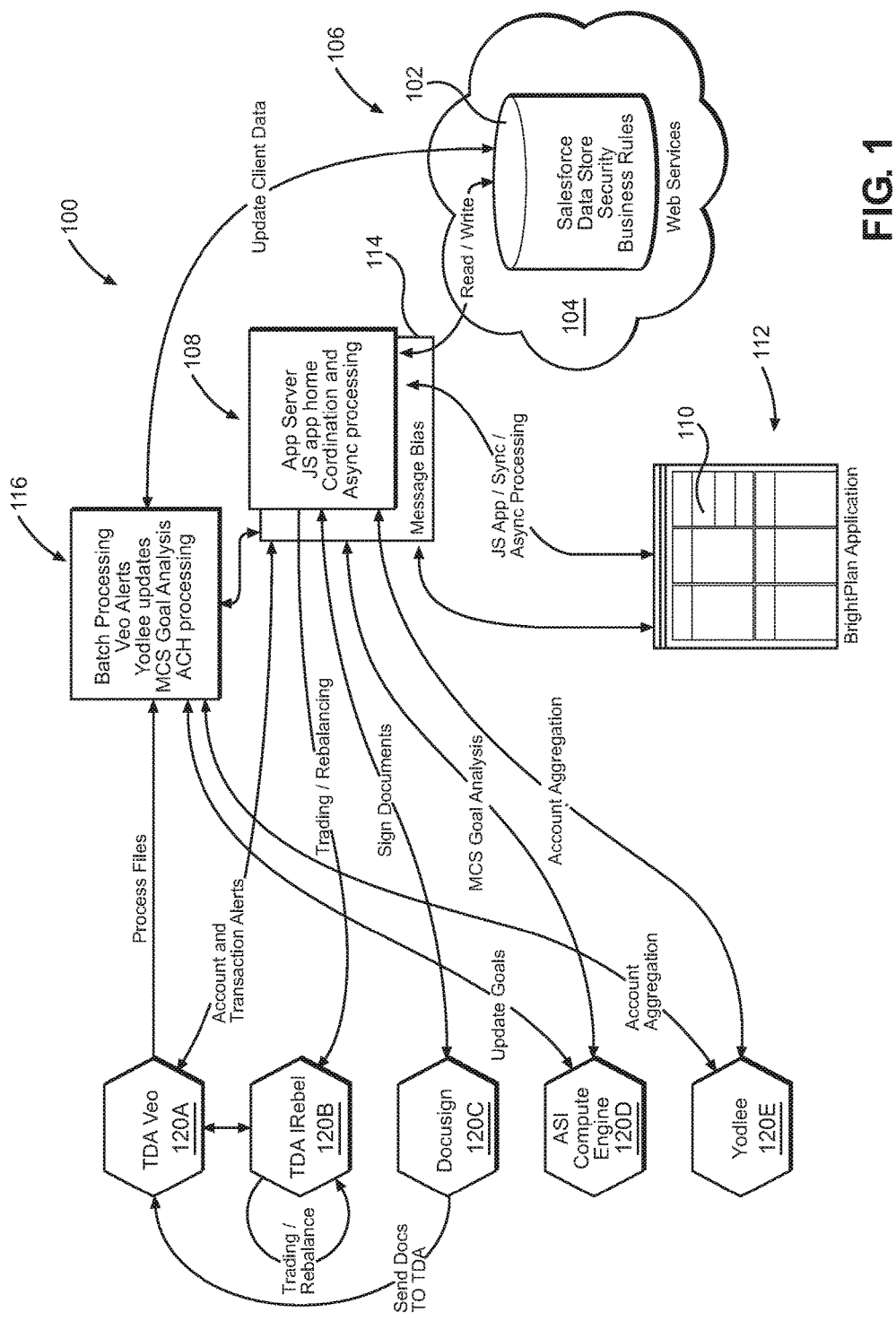
FIG. 1 is a schematic diagram of a computing architecture that includes a system constructed in accordance with the present disclosure.

Generally speaking, the present disclosure provides secure messaging platforms and methods that allow for custodial account creation and automated control thereof. These platforms and methods advantageously implement secure messaging features and latency compensation features which allow the user to have an uninterrupted and secure user experience. Example implementations according to the present disclosure allow these platforms to be used for account maintenance and modification. In sum, a user can interact with their profile or account securely and without latency. By way of example, a user can perform various operations on their account. These various operations may require data intensive operations by a backend system in response. These data/compute intensive operations, but for the solutions described herein, would result in latency or other similar deleterious effects that would decrease the user experience.

Additionally, these platforms can be built upon existing third-party systems or services and can provide secure access and messaging into and out of these third-party systems and services. The security features described herein can isolate both system components and data from unauthorized access.

Some embodiments allow components of the platform to operate as a robotic advisor that designs and automatically implements actions in response to goals for a user.

In some embodiments, the systems and methods herein can continually review a plurality of accounts for a user and selectively adjust actions for these accounts based on the stated goal(s). These systems and methods can utilize machine learning to model account data against goals and generate instruction sets in response to these analyses. These outcome of these analyses can be transmitted to a third-party service in order to adjust one or more of the plurality of accounts in order to achieve the goal(s). This is referred to generally as automated account rebalancing.

Thus, some of the systems and methods disclosed herein comprise a re-balancer that may implement iterative machine learning in order to execute auto-configuration of accounts to ensure that goal(s) will be achieved. In some embodiments, a third party rebalancing system or service can be utilized. The systems disclosed herein can also implement other digital services, such as a document signing service or educational services. These educational services can be delivered, for example, through a user-facing application or interface disclosed herein, through a client-side downloadable application or externally referenced or hosted blogs, video or other such similar mechanisms.

In various embodiments, the systems and methods disclosed herein can generate a complete and robust profile of a user based on what the user purchases, user behaviors related to financial decisions, and so forth. These types of data are aggregated from a plurality of accounts such as bank accounts, investment accounts, credit reports and accounts, credit card statements, and so forth—just to name a few.

In some embodiments, the systems and methods herein are configured to allow for the aggregation of many accounts for centralized control, functional area goal planning, advisor-related content distribution, account and goal reporting, and various notification features. In one or more embodiments, the systems of the present disclosure can evaluate the goals and assets of a user and generate digital content recommendations for the user. In these instances, digital analytics are used as a basis to recommend advisor content for the user. For example, the systems and methods select content based on what similarly situated users clicked on and consumed. These similarities are determined relative to similarities in user financial behavior, account similarities, and goal similarities—just to name a few.

The systems and methods can also leverage deep analytics across anonymized customer profiles and accounts in order to make informed decisions and instruction sets for re-balancing the user accounts. The systems can also automatically generate new suggestions for a user based on current or predicted probabilities and/or goal(s). For example, a system can suggest a more aggressive repayment schedule for a debt if the system determines that selective adjustments to investments will result in higher dividends that originally modeled or planned. These features are enabled because the system tracks goal progress over time, collecting, reanalyzing, and rebalancing accounts as needed. During these processes, the system can determine if goals can be achieved more quickly than initially expected based on the ever changing nature of the user's accounts, inputs (e.g., for example changes in life-events), income or expense patterns, and any combinations and permutations thereof.

According to some embodiments, the systems and methods herein implement security layers that utilize SSL (secure socket layer) and encryption. These features, in addition to the token-based transaction features described infra, provide solutions to problems that arise in extensible or modular computing environments, where systems are built on existing third party resources.

FIG. 1 is a schematic diagram of an example secure messaging system (hereinafter system 100) for practicing aspects of the present disclosure. The system 100 comprises a data retention system 102, a predictive analytics system 104, a web services layer 106, and an application server layer 108 that provides, for example, modeling and predictive analytics.

In some embodiments, the data retention system 102 and predictive analytics system 104 are in secure isolation from a remainder of the secure messaging system 100 through a security protocol or layer that will be described in greater detail herein. The data retention system 102 can also provide additional services such as business logic, data analysis, risk model analysis, security, data privacy controls, data access controls, disaster recovery for data and web services—just to name a few.

In various embodiments, the system 100 comprises connections (either direct or indirect) to a plurality of user accounts that each comprises commercial (e.g., financial account, consumer, fiscal data, etc.) information regarding a user. In some embodiments, at least one of the plurality of user accounts comprises a custodial trading platform.

The web services layer 106 generally provides access to the data retention system 102. According to some embodiments, the application server layer 108 is configured to provide a user-facing application 110 that accesses the data retention and predictive analytics systems through the web services layer 106. In some embodiments, the user-facing application 110 is secured through use of a security token cached on a web browser 112 that provides the user-facing application 110.

In one or more embodiments, the application server layer 108 performs asynchronous processing based on user interaction with a goal-based planning application (referred to herein as a user-facing application/interface) that processes data from a plurality of user accounts. A goal-based planning application and/or services can reside and execute on the application server layer 108. In other embodiments, the goal-based planning application may reside with the predictive analytics system 104. In another embodiment, the goal-based planning application can be a client-side, downloadable application.

In some embodiments, the system 100 uses the data provided by the user and their accounts as input to modeling and creating an interactive model. A view of this is provided by a front end framework and rendering application provided in Javascript or another suitable format. The front end framework is cooperatively provided by the web services layer 106 and the application server layer 108.

Generally speaking, the system 100 provides a wrapped web service layer that is built on top of or otherwise integrates a third party service, such as Salesforce™. In one or more embodiments, the web service layer 106 facilitates account updates and rebalancing through the system 100 and provides for separation between scenario modeling and probability calculations (e.g., schema) and a controller that defines and enforces rules of the schema for a user.

According to some embodiments, the application server layer 108 delivers Javascript to the web browser 112 when the user logs into the system 100. The application server layer 108 is the location where services are brokered for the user. For example, when a user desires to open a goal to look at details of the goal, the application server layer 108 calls the web service layer 106 for goal data for the user.

As noted above, the systems of the present disclosure implement security features that involve the use of multiple security tokens to provide message security in the system 100. Again, the system 100, in some embodiments, is built upon a third party service, such as Heroku™ or Salesforce™. The multi-token security schema implemented in the system 100 reduces the likelihood that system data will be compromised or accessible to any of the third party resources that the system 100 uses or is built upon.

Security tokens are used between the web service layer 106 and application server layer 108. In some embodiments, security features are not continuous to the web browser 112. Thus, a second security layer or link is established between the web browser 112 and application server layer, 108. In one or more embodiments, a first security token is cached in the application server layer 108 between the web browser 112 and the application server layer 108.

In some embodiments, the system 100 implements an architected message bus 114. In an example usage, a client requests a refresh of their accounts and user interface through their web browser 112. Rather than performing the refresh, which could involve data intensive and/or compute or operational intensive procedures by the system 100, the message bus allows the request for refresh to be processed asynchronously by a batching process 116 and provides a means for allowing the web browser 112 to continue to display a user-facing application to the user, allowing the user to continue to access accounts, content, and other offerings without waiting on the system 100 to complete its refresh of the user accounts and so forth. Once the requested refresh is complete, the application 110 is informed by message on the message bus and can auto-refresh appropriate data in the browser 112.

Again, because the system 100 can utilize numerous user accounts in order to generate probabilistic suggestions, recommend content, perform account rebalancing, and update goal(s) and plans, the system 100, if implemented without the message bus 114, might provide an unacceptable user experience. This unacceptable user experience could be due to latency caused by the background refresh operations, or other system related jitter, delay and/or latency caused by other factors.

Also, latency can be remediated at the user-facing application based on the manner with which the user-facing application is created and how the data that is displayed through the user-facing application is stored and updated. For example, data displayed on the user-facing application that changes frequently, such as stock quotes, can cause frequent and unwanted refreshing of the entire user-facing application and GUIs. The present disclosure provides a solution to this issue by separating what is displayed on the GUI with the actual underlying data. The underlying data displayed on the GUI of the user-facing application can be updated, as needed, on a segment-by-segment basis (could be defined as a zone of pixels on the display) at a granular level, rather than updating the entire GUI. That is, the GUI that renders the underlying data is programmatically separate from the underlying data cached by the client (e.g., device rendering the GUIs of the user-facing application). Due to this separation, when data being displayed on the GUI changes, re-rendering of the data is performed at a granular level, rather than at the page level. This process represents another example solution that remedies latency and improves user experiences with the user-facing application.

To facilitate these features, the web browser 112 will listen on the message bus 114 for an acknowledgement or other confirmation that the background processes to update the user account and/or the user-facing application have been completed by the application server layer 108. The user-facing application (or even part thereof) is updated as the system 100 completes its processing. This allows the user-facing application provided through the web browser 112 to be usable, but heavy lifting is being done transparently to the user by the application server layer 108. In sum, these features prevent or reduce latency issues even when an application provided through the web browser 112 is "busy." For example, a re-balance request is executed transparently by the application server layer 108 and batch processing system 116. This type of transparent computing behavior by the system 100 allows for asynchronous operation (initiated from the application server layer 108 or message bus 114).

In some embodiments, a batch engine 116 is included in the system 100 and works in the background to process re-balance requests and coordinate a number of services. An example re-balance request would include an instance where a user selectively changes a goal, such as selecting that they would prefer to pay off a debt in five years rather than seven. The batch engine 116 will transparently orchestrate the necessary operations required by the application sever layer 108 in order to obtain data from user accounts, re-balance the user's goal(s), and if needed generate instruction packages. These instruction packages can be transmitted to third parties for automatic execution to re-balance the user's accounts and ensure that a new or updated goal(s) is achievable and has been implemented.

According to some embodiments, the batch engine 116 is configured to process requests transparently to a user so that the user can continue to use the user-facing application without disruption. For example, this transparent processing can occur when the application server layer 108 transmits a request to the web services layer 106 for data, and a time required for updating or retrieving the data meets or exceeds a threshold. For example, the threshold might specify that if the request will take more than five seconds to complete, then the batch engine 116 can process the request transparently. The selected threshold can be system configured.

In some embodiments, the application server layer 108 initiates an updating processes from input received through the user-facing application such as when a user logs into the system or when the user requests rebalancing. The application server layer 108 executes a plan in accordance with goal(s) and re-updates models and probabilities related to the goal(s), along with statuses and current account information for the user.

In general, the application server layer 108 is configured to broker requests for data through the web services layer 106. In some embodiments, security of data transmission through the system 100 is improved by use of multiple security tokens. In one embodiment a security token cached on the web browser 112 is different from a security protocol or security token utilized between the application server layer 108 and the web services layer 106.

In various embodiments, the user-facing application provided by the system 100 is configured to analyze the plurality of user accounts to determine if the plurality of user accounts are compliant with the goal-based plan. In response, the system 100 can automatically generate trade requests for execution by a custodial trading platform (third-party trading platform) based on deviations determined during analysis that indicate that the plurality of user accounts are not complaint with the goal-based plan. That is, if the user needs to re-balance their accounts or behaviors based on a determination that their current assets and/or behaviors will result in their goal(s) not being achieved, the system 100 can detect the underperforming parts of the user's accounts and recommend a remediating action that re-balances the accounts to ensure that the goal(s) is achieved.

Part of the process of achieving goals involves educating the end user. Thus, in some embodiments, the system 100 can maintain a repository of educational content related to goals that may be achieved using the system 100 such as debt elimination, savings, retirement, and so forth. The system 100 can survey other profiles of users that are similar in financial position, have similar behaviors to the user, and desire similar goals or outcomes. The system 100 can determine if these other anonymized users have achieved their goals and can recommend rebalancing in order to improve a likelihood that the system, if it implements the same or similar strategies, will also achieve the same or similar goal as the successful users. The system 100 can also use these analytics to suggest or recommend educational content to the end user. For example, if the system determines that many users who were ultimately successful in starting their own business successfully completed basic accounting educational modules offered by the system 100, the system 100 can suggest these or similar education modules for the user. Thus, the user-facing application is configured to suggest digital content for the user based on deep analytics of a plurality of anonymized user accounts and the goal-based plan of the user. Again, this analysis can be accomplished using anonymized information obtained from other users and their associated accounts, analytics, goals, plans, and outcomes.

In an example operation, the system 100 can interface with a plurality of third party services, such as a trading platform service 120A, a rebalancing service 120B, a digital document signing service 120C, a simulation and scenario service 120D, and financial data service 120E. In some embodiments, the batch engine 116 can be configured to communicate with the trading platform service 120A, the predictive analytics system 104, and the financial data service 120E. For example trading account files can be exchanged between the batch engine 116 and the trading platform service 120A, such as trading instruction sets (for automatically rebalancing user accounts), and account information.

Scenario modeling and/or goals can be updated between the batch engine 116 and the predictive analytics system 104, while account aggregation can be facilitated between the batch engine 116 and the financial data service 120E.

Financial modeling is performed in the system 100 at a variety of layers as noted above. The system 100 then provides these models and associated data at runtime to the simulation and scenario service 120D and utilize its algorithms, such as Montecarlo simulations, and utilize the output of the scenarios to project future growth of investments, probability of success, and other such financial metrics.

In general, the batch engine 116 provides services such as trading platform service alerts, financial data service updates, goal analysis and updates, and ACH (automatic clearing house) processing, and so forth.

As noted above, the application server layer 108 is configured to provide the Javascript that enables the user-facing application provided on the web browser 112. Application synchronization and asynchronous data processing are facilitated by between the application server layer 108 and the batch engine 116, using the message bus 114.

According to some embodiments, the system 100 facilitates various synchronization processes such as account opening using the trading platform service 120A and the digital document signing service 120C. Funding of an account can be facilitated from a user's bank to the trading platform service 120A. Account dates can be obtained as desired from the trading platform service 120A. The system can also assign model portfolios, execute rebalancing of accounts through the rebalancing service 120B, and automatically generate and analyze goals using the predictive analytics system 104. User accounts can be linked through the financial data service 120E. Data can also be stored and retrieved from the Salesforce™ repository on which the web services layer 106 is built. A portion of the security tokens used in the system 100 are generated at the third party service on which the web services layer 106 is built, as described in greater detail above.

In some embodiments, the application server layer 108 cooperates with the message bus 114 to provide transparent processing of requests from the user-facing application. This transparent processing allows the application server layer 108 to continue to service the user-facing application. Thus, the message bus 114 facilitates completion of requests in the background, while the user continues to utilize the user-facing application without latency, or with reduced or acceptable latency.

The message bus 114 can be used to provide various batch processes such as account data retrieval and updating, account funding, trading and rebalancing, goal analysis, linked account updating, storing and retrieval of data from the third party service, and account and transaction related alerts.

As noted above, the web service layer 106 is built on top of a third party service, such as Salesforce™. This third party service operates as a data store, provides security for stored data, and stores and executes business rules.

FIG. 2 illustrates a layered schematic representation of the system 200 in conjunction with various third party applications and services 202. Some of the third party applications and services 202 described above provide a base upon which the system 200 is built. A predictive analytic and machine learning layer 204 is included. In some embodiments, a security layer 206, which includes the dual security token features of the present disclosure are built upon the predictive analytic and machine learning layer 204. Various functionalities and services are implemented through the application server layer described above, such as goal planning, investment services, content delivery, account reporting, account aggregation, notifications, and client profiles. These are all accessible through the user-facing application 208.

In more detail, the third party service layer provides a third party service token. The system 200 implements its own session-based token when the client initiates a connection to the system. This session-based token identifies a session and can be used by the third party service to identify a user of the session. The security layer 206 acts as an intermediary providing, for example, a firewall that prevents data leakage from the system to the third party service and vice-versa. This security layer 206 prevents any subsystem (third party service or application) that is leveraged by the system from compromising the components of the system, such as the application server layer and the batch engine. This provides a solution to a separation of concerns paradigm created when one system is built on another, such as the system 100 being built upon a third party service. In one example, the web browser used by the client (e.g., end user) is considered one subsystem. The user has various accounts, for example, three banking accounts, and several credit card accounts. Authentication credentials for accessing these accounts can be stored in a token, such as the third party service token, which is not shared with or accessible to the web browser.

Furthermore, the use of a multi-token security protocol allows for the system to be modular inasmuch as the third party service can be removed and replaced without compromising the security of the system, due to the fact that authentication credentials are stored in the third party service token rather than the session based tokens used by the system during a user session.

In some embodiments, third party systems are integrated in a modular manner. Thus, these third party services can be exchanged or replaced as desired without affecting the security and integrity of the system 100. Credentials used to communicate with these third party systems are not identical to the ones used by a user to when accessing the system 100. These third party credentials used are token based, and tokens are refreshed periodically in a cache of the web browser.

In some embodiments, the system 200 can provide various functionalities such as dynamic goal model selection, content recommendations (e.g., educational content), goal and action recommendations, cohort analysis and recommendations, automated investing, and automated custodial accounts—just to name a few. With respect to dynamic goal model selection, the system 200 is configured to combine goal parameters (such as individual attributes for user accounts that ensure that a goal is met within a specified time frame), and a user profile to determine a model portfolio for accomplishing the goal(s). This functionality also monitors empirical account information over time and selectively adjusting or rebalancing accounts as goal parameters evolve. This can be performed at various increments of time, such as daily, weekly, or other time periods.

Content recommendations can be facilitated by analyzing metadata tags of educational content and mapping such content to a client profile and their goals. The system can then suggest and push relevant content to a user, as well as train a predictive engine to fine tune the recommendation for the best (most suitable for the user) content.

Goal and action recommendations can include actions for a client based on their user profile and associated goals. The system can also recommend goals based on a user profile and a current financial plan (schema), and predict a most likely next goal for the user.

Cohort analysis and recommendations can be provided when the system analyzes all client profiles and financial plans in the abstract (and anonymized) to determine best practices relative to general or specific demographics. The system can also leverage various cohort analyses to make recommendations to clients such as budgeting, saving, planning, and so forth. The system can also assign badges and benchmarks to clients based on comparisons with similar clients.

With respect to automated investing, the system is configured to utilize a dynamic mode selection for a suitable investment strategy based on stated goal(s). The system can automate saving through ACH deposits, and can re-balance models monthly. The system could also allow for tax lot harvesting at the tax lot level as appropriate for the user, as well as aggregate all accounts into a net-worth financial dashboard provided through the user-facing application.

The system can also automatically open new accounts for the user, as well as orchestrate funding and transaction reporting.

Figure 3:
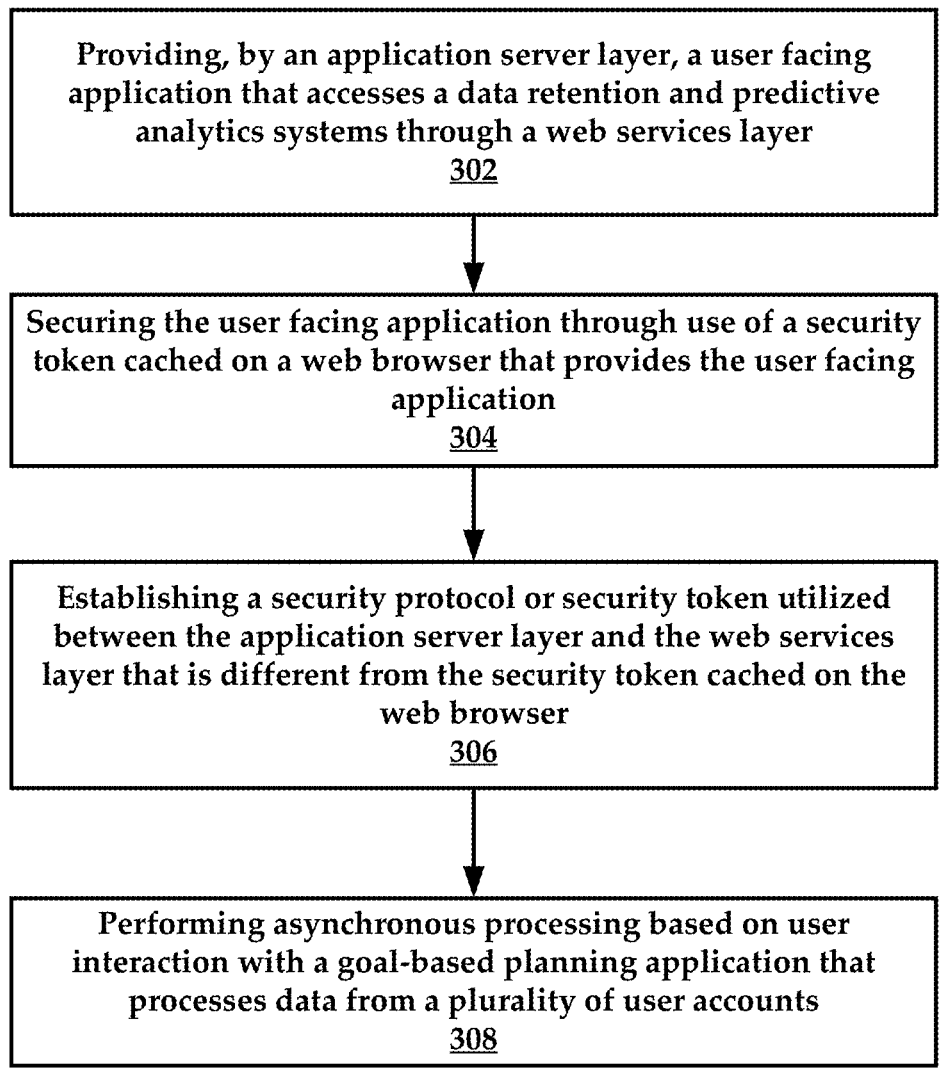
FIG. 3 is a flowchart of an example method of the present disclosure.

FIG. 3 is a flowchart of an example method of the present disclosure. The method generally comprises a step 302 of providing, by an application server layer, a user-facing application that accesses data retention and predictive analytics systems through a web services layer.

The method also includes a step 304 of securing the user-facing application through use of a security token cached on a web browser that provides the user-facing application.

In some embodiments, the method includes a step 306 of establishing a security protocol or security token utilized between the application server layer and the web services layer that is different from the security token cached on the web browser. This provides, as noted above, a separation of concerns and provides security enhancement that prevents compromising of the system by any of the subsystems or third party services/applications that are leveraged by the system.

Next, the method includes a step 308 of performing asynchronous processing based on user interaction with a goal-based planning application that processes data from a plurality of user accounts. This asynchronous processing through, for example, a batch engine, allows data processes such as account updating, account rebalancing, modeling, and so forth to occur transparently to the user. In some embodiments, the method can include asynchronous processing, such as generating automatic account creation, account modeling relative to goals, and automatic trading instruction set generation—just to name a few.

Figure 4:
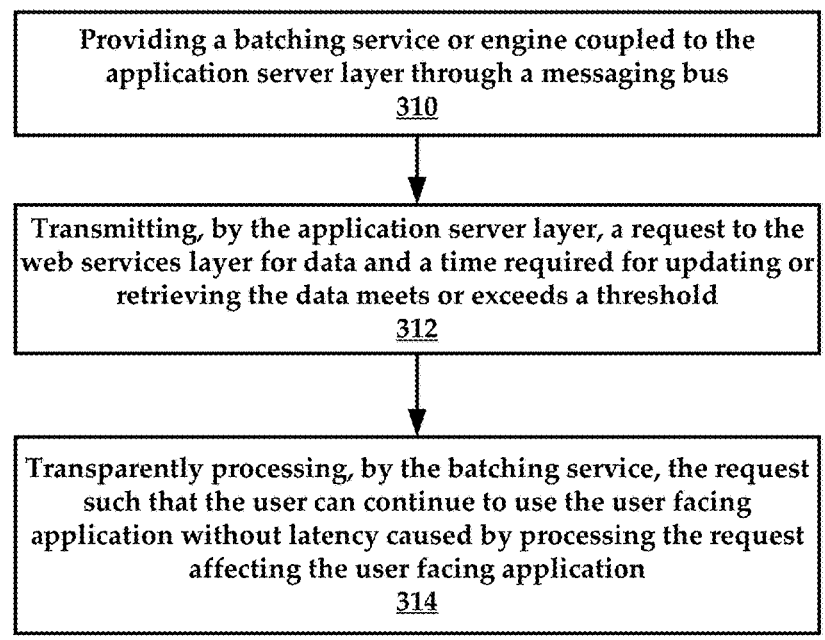
FIG. 4 is a flowchart of another example method of request batching and processing, and latency reduction.

Referring now to FIG. 4, which includes a flowchart of an example method performed by a batch engine. This method can build upon the method of FIG. 3. In some embodiments, the method can include a step 310 of providing a batching service or engine coupled to the application server layer through a message bus, as well as a step 312 of transmitting, by the application server layer, a request to the web services layer for data and a time required for updating or retrieving the data meets or exceeds a threshold. If the threshold is exceeded, the method can include a step 314 of transparently processing, by the batching service, the request such that the user can continue to use the user-facing application without latency caused by processing the request affecting the user-facing application. This method can be integrated into the method illustrated in FIG. 3.

As noted above, the modular and secure messaging systems and methods described above can be utilized to facilitate or host an autonomous advisory service that provides a user with goal and time oriented fiduciary services. That is, the systems of the present disclosure are configured to act as a pure fiduciary, which provides an objective basis and set of rules for optimizing financial behaviors and accounts of a user in order to attain various goals. Rather than relying on subject preferences and trading strategies of human investment strategists, who often operate in the best interest of a company or themselves, the systems of the present disclosure provide improvements in electronic account management, automated education, and electronic trading through the use of specific modeling and rules, rather than human investors, to create trading instruction sets based on a holistic set of parameters for the user in terms of their goals.

This allows for automated rebalancing and reallocation of the user's assets over time as market changes and account changes occur.

To be sure, human investors and advisors do not use these objective sets of rules, and instead relied on subjective determinations to suggest investments and execute trades. Often, these investment suggestions are made to enrich someone other than the investor. The present disclosure provides methods for creating and using objective rules, models, and feedback in order to dynamically reallocate a user's assets across various accounts and investments in order to ensure that the user receives a forecasted amount of dividends or money at a specified period of time that is linked to one or more goals.

The ability of the systems disclosed herein to create complex and data intensive models used to recommend and invest a user's assets, as well as create automatic trading instruction sets that never require the intervention of a human being to implement, provide distinct technological improvements in the field of electronic trading account management. These systems and methods can be facilitated through the secure messaging platforms and systems described in greater detail supra.

Also, in another distinct advantage to a traditional human investment strategist or manager, the systems disclosed herein never retain custody of client funds. While a system of the present disclosure can instruct various third party systems to exchange monetary assets for investment vehicles, as well as other account-to-account transactions, these are performed by the system at an arm-length distance. For example, the systems can transmit to a user's bank a set of ACH instructions that inform the bank to transfer money to a trading platform in order for the trading platform to execute a set of trading instructions that includes the purchase of stocks or bonds with the ACH transferred funds. Thus, the systems disclosed herein can be utilized to send instruction sets to the various third party systems in order to allow for these systems to be utilized independently and/or cooperatively by the systems, while the systems remain at an arm-length distance and without retaining custody of a user's funds.

In this way, the systems disclosed herein provide a mechanism for using investing is a tool to reach goal; these systems are not purely investment driven. Goals established by the user inform the system to automatically invest or rebalance as needed, based on the unique set of parameters for the user. These unique set of parameters include, for example, user demographics, such as spending habits, income, marital status, dependents, user's age, net worth, risk willingness, goal priority, taxes, and other similar parameters that are indicative of a user's financial position on a macro and micro scale.

In some embodiments, the user-facing application disclosed above provides a means for allowing the user to input requested data and view their net worth on a real-time basis. This view of real asset allocation is generated from information gathered across numerous accounts of the user.

The system then provides a custom portfolio, overall built for the user on their specifics. Using a single click the user can cause the system to execute actions that cause their accounts to be allocated or reallocated after configuration. For example, the user can divulge information about themselves, their age, children, marital status, what's important or valuable to them (e.g., debt, saving, retirement, etc.), income, lifestyle desire and so forth. The system can then project what this user might need to achieve these life goals.

In some embodiments, the systems can create a plurality of outcomes (possible if/then scenarios) that are then displayed to the user through the user-facing application. The user-facing application includes tools or UI elements that allow the user to adjust their goals. Example UIs are provided in FIGS. 10-12, which are described in greater detail infra. These adjustments cause changes in the goals and the user can fine tune these as desired. This information is then combined with other sub-systems to figure out which investment portfolio(s) apply best to this individual. Again, these are objective rule sets that allow the system to make objective choices for the user that can be approved or denied by the user.

If approved, the system makes choices for the user relative to their accounts. In sum, asset allocation is optimized for the goal(s), and fine-tuned for the user by the system. The system can create comparisons between other anonymized users that are seemingly similar to the user, but the plan ultimately selected for the user will be optimized on an individual and granular level.

In some embodiments, changes to a user's parameters cause a recalculation across the board for any goal affected by the change. In some embodiments, the user-facing application can display to the user a delta between what the user has and what they need to accomplish a goal based on their accounts. The system generates recommendations that are displayed and the user can accept or reject these changes.

As goals are input to the system, suggestions of portfolio(s) are matched to parameters of the goals. The user can see these effects in real-time. Investments will be displayed in front of the user visually so that they can understand the suggested changes.

As noted above, in some embodiments, the systems disclosed herein can select an investment portfolio (e.g., a goal-based plan as described above) from a set of various investment portfolios maintained by the system. The selection and fine-tuning of a portfolio (e.g., investment plan) is based on the holistic position of the user's accounts in view of their goals.

In some embodiments, the systems disclosed herein can generate risk models based on the user's account information in order to select a suitable investment portfolio for the user. These models are extensible and can be modified over time as new data is gathered. For example, if a system detects that the user has increased their income, the system can incorporate this new information into a model that is used for this particular user. As the model is updated, the system can use this updated model to rebalance the user's accounts (if needed), which includes creating various instruction sets that inform each of the implicated third party systems to perform various actions. These actions undertaken are based on changes to the user's accounts that affect achievement of a goal. For example, based on increased income, the system may update the model for the user and apply this updated model to select a new investment portfolio for the user. In another example, rather than selecting new goals and/or portfolios, the system can suggest an account rebalancing that includes additional automated payments to a loan balance, when the user's goal is related to paying off debt.

In some embodiments, the systems disclosed herein utilize two or more factors such as goal ability versus tolerance of risk. In an example use case it will be assumed that an attribute weight of a length of goal is 40%, and a withdrawal attribute (long versus acute) 35%, age 15%, liquid net worth 10%, and so forth. Other attributes such as knowledge, education, expectations, response to bad experiences, and so forth can also be utilized by the systems.

These various inputs can be deduced when the user initiates creation of an account. FIGS. 5A and 5B collectively illustrate an example set of queries that are presented to a user in order to deduce their specific preferences and/or behaviors related to their financial situation. Again, these queries provide an objective basis for gathering information from the user that is utilized to create models, suggest and select goals, suggest portfolios, and rebalance accounts—just to name a few.

For example, the user is asked about goal timelines, withdraw timeframes, liquid net worth, and risk tolerance. With respect to risk tolerance, this attribute or parameter is deduced by the system based on responses to scenarios presented to the user, rather than a subjective determination based on a user's perceived opinions.

In various embodiments, each of these facets is assigned a weight by the system. The weight adjusts the raw score for each of these query responses in order to generate a goal ability score and a risk tolerance score. These dual scores are then used by the system to navigate and select options from various matrices, such as those illustrated in FIGS. 6 and 7.

Figure 6:
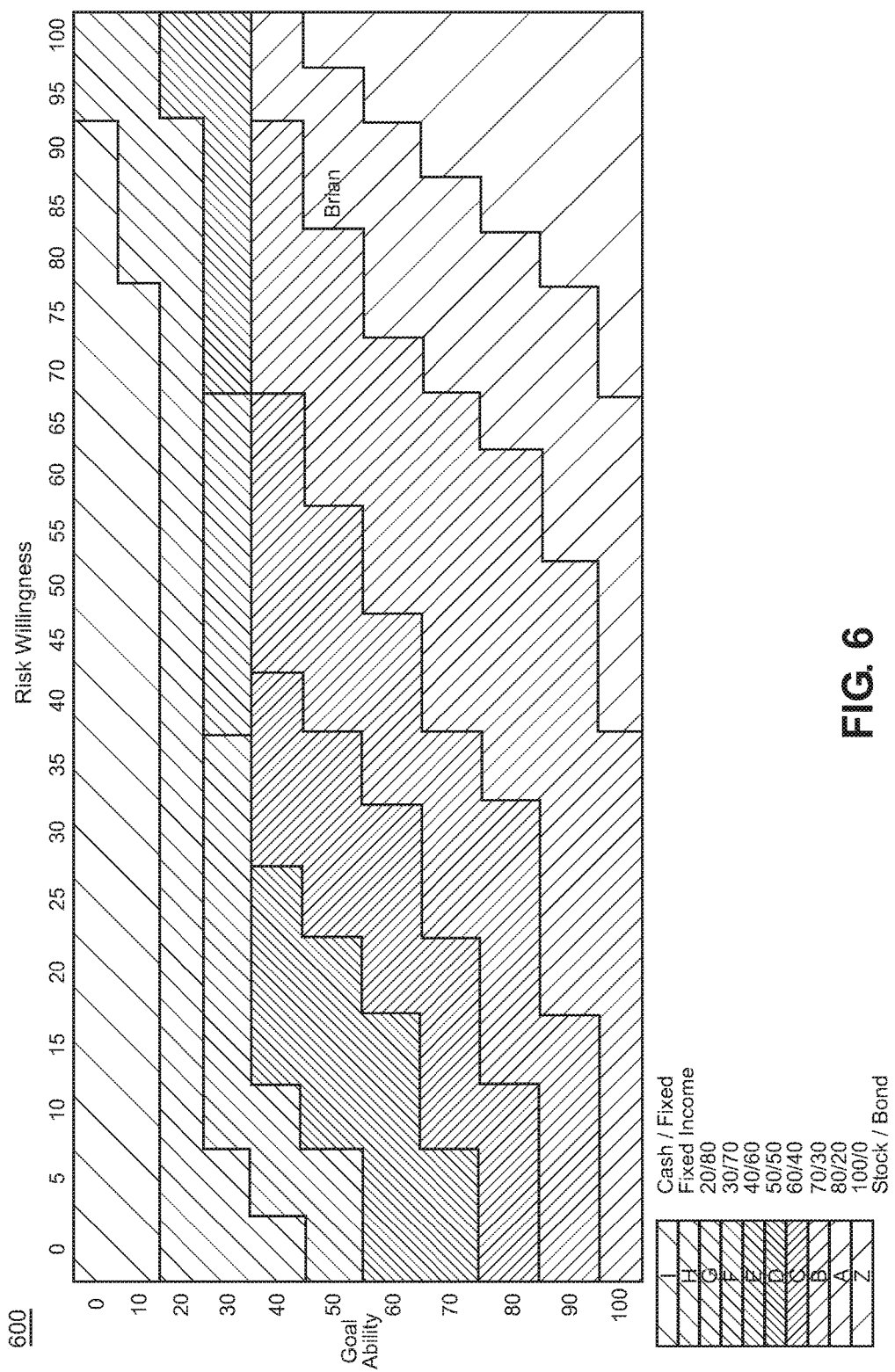
FIG. 6 is a matrix that generally plots risk willingness scores and goal ability scores, with nodes indicating investment plans.

With respect to FIG. 6, it illustrates an example investment portfolio model matrix 600 where goal ability versus risk willingness are charted against one another. In some embodiments, ranges for each of these two facets are determined from anonymized analysis of other users of the system. Based on a position in the matrix 600, a model related to 70/30 is selected. In this instance, the split indicates that the user should have a split of 70 percent stocks and 30 percent bonds.

Figure 7:
FIG. 7 is a matrix that generally plots risk willingness scores and goal ability scores, with nodes being mapped to specific investment plans.

Another example investment portfolio model matrix 700 is illustrated in FIG. 7. As illustrated, each box of the matrix 700 corresponds to a unique investment model/portfolio and each box is more granular than the general categories illustrated in FIG. 6 as it denotes a specific model. For example, the system would select model X60_75.

In sum, the systems disclosed herein are configured to compare a user's risk willingness versus goal ability. Matrices utilized by the system suggest a recommended plan (e.g., investment plan) based on these risk and ability factors among others. As these change over time, the system can automatically select a new portfolio for the user based using the empirical performance of the user's accounts or progression towards their goal(s). For example, if the user's goal is saving for retirement, the system can automatically increase the risk level for the user, which causes the system to select a new node from the matrices that is more risk averse. This process will be repeated as the user gets closer and closer to retirement so that the user is insulated from risk to the greatest extent possible.

As noted above, it is possible for the user to override these suggestions. In some embodiments, the system can ask for user approval prior to transmitting various instructions sets to third parties. These instructions sets will reallocate or rebalance the user's accounts in order to comply with a new model or investment portfolio. For example, if the user wishes not to be more risk averse closer to retirement, the user can override the suggestions provided by the system. In various embodiments, this can prompt the system to suggest educational materials or training. That is, atypical behavior by the user, either relative to their accounts and goals, or the behaviors of other similar users can result in the system suggesting educational content to the user. The system could also transmitting warning alerts to the user-facing application.

Again, the system can automatically generate trade requests based on the goals, user account information, and models selected. The system can utilize existing third-party platform APIs. These instruction sets are driven by goal(s) and analysis by the system as noted above. Investment recommendations (e.g., investment plans/portfolios) can be tailored to the specific needs of the user or can be augmented based on deep data of anonymized user accounts. In some embodiments, account rebalancing is executed through system rationalization of account data against models maintained by the system. In sum, the systems disclosed herein can leverage Artificial Intelligence (AI) and predictive analytics across an anonymized user-base in order to create suggestions for the user.

In addition to account rebalancing, the systems herein can also provide the user with other ancillary recommendations related to goals. For example, if the user has a goal of home ownership within the next three years, the system will analyze, across a plurality of user accounts, what home price is likely to be a sound investment for the user, taking into account the other goal(s) of the user such as retirement and college savings.

By way of non-limiting example, once the system models the user's accounts and goals, the system can then utilize a third party application, such as a multi-listing service (MLS) to suggest to the user one or more preferred zip codes based on a median home price that the system has selected for the user. The system can then set a down payment savings goal for the user, if desired, and automatically create and fund a mortgage savings account with a bank, or a money-market account.

Figure 8:
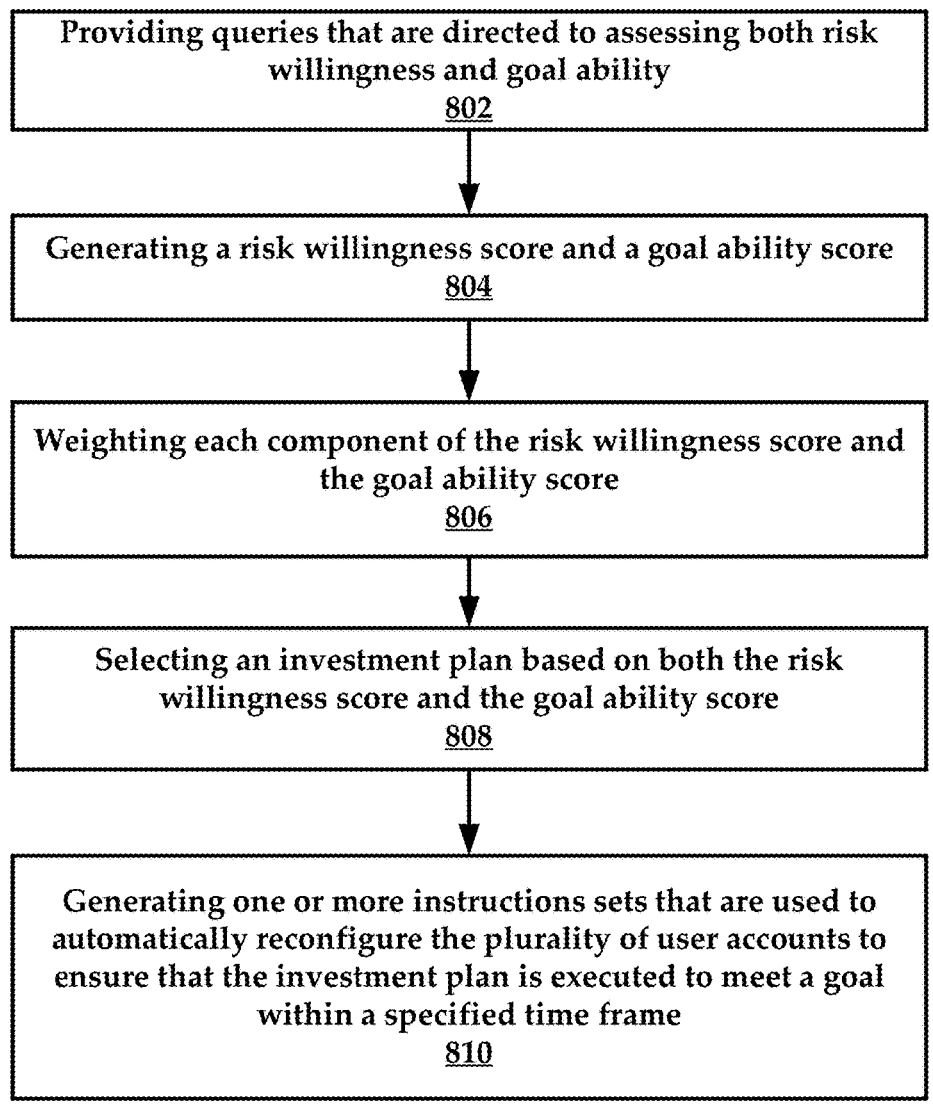
FIG. 8 is a flowchart of an example method of the present disclosure, where a tailored investment plan is created and executed in accordance with the present disclosure.

The following example method illustrated in FIG. 8. In some embodiments, the method can include the steps of the method of FIG. 3, which generally describes the operations of a secure messaging system that provides both security and extensibility (e.g. modular computing). In some embodiments, the method includes a step 802 of providing queries that are directed to assessing both risk willingness and goal ability. Example queries are found in FIGS. 5A-B. Once responses to these queries are received, the method includes a step 804 of generating a risk willingness score and a goal ability score based on the responses. Some embodiments include an optional step 806 of weighting each component of the risk willingness score and the goal ability score.

Using the weighted (or non-weighted scoring) the method includes a step 808 of selecting an investment plan based on both the risk willingness score and the goal ability score. This can include, for example, using one or more matrices to select an investment plan (e.g., portfolio) based on a ratio of the risk willingness score and the goal ability score. Example matrices are found in FIGS. 6 and 7.

Next, the method includes a step 810 of generating one or more instructions sets that are used to automatically reconfigure the plurality of user accounts to ensure that the investment plan is executed to meet a goal within a specified time frame. For example, this can include generating instruction sets that create user accounts, digitally sign documents, initiate fund transfers, reallocate investments in differing proportions, and so forth.

Figure 9:
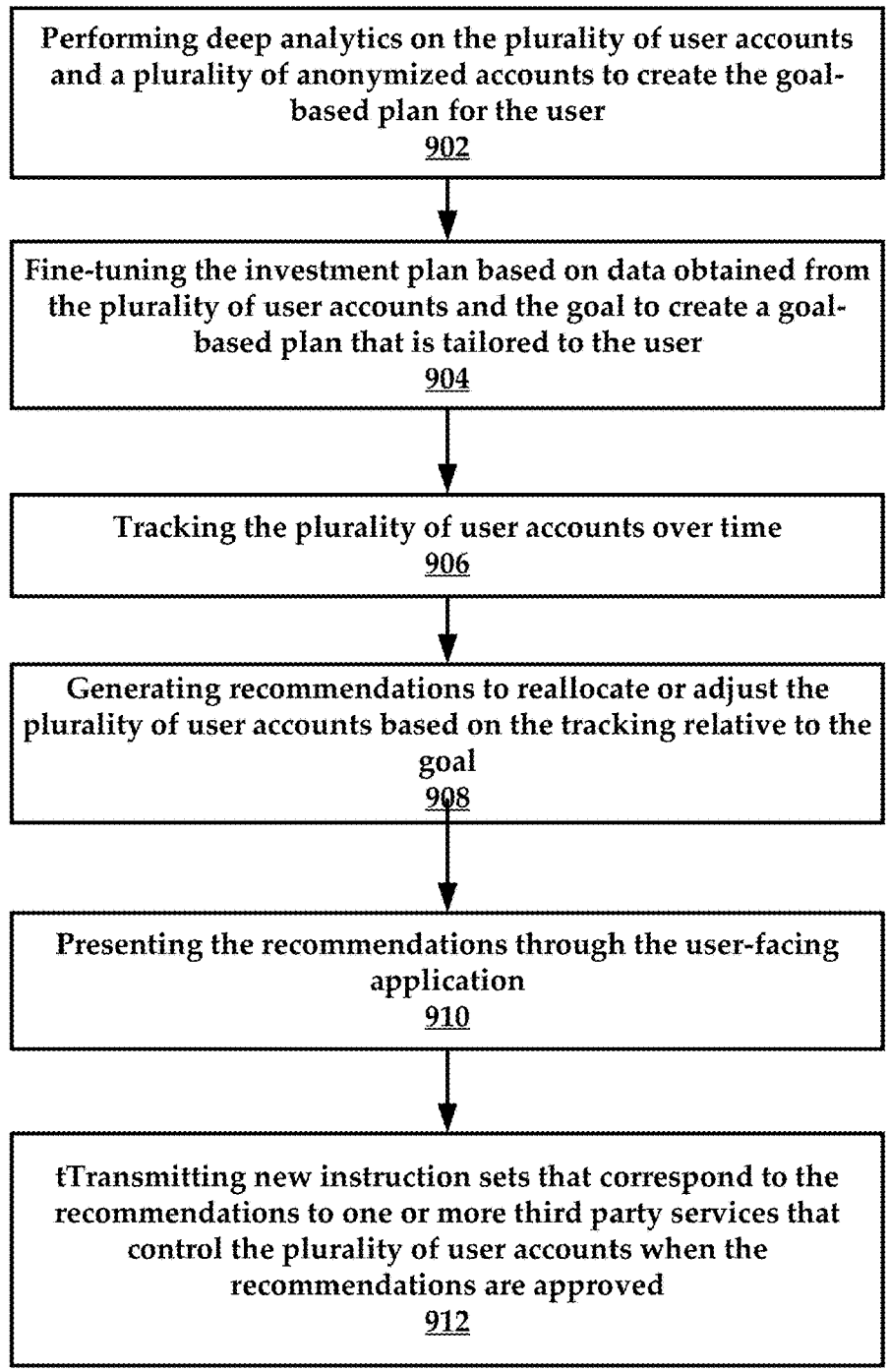
FIG. 9 is flowchart of another example method for creating a goal-based plan for a user that includes tailoring of the investment plan specifically for the user.

FIG. 9 is a flowchart of an example method for fine-tuning an investment plan/portfolio selected in the method of FIG. 8 into a goal-based plan. That is, the method in FIG. 9 converts the selected investment model or plan into a specific plan for the user that is based on the objective and empirical information gathered from the user's accounts, which can include ongoing tracking and analysis over time.

In some embodiments, the method includes a step 902 of performing deep analytics on the plurality of user accounts and a plurality of anonymized accounts to create the goal-based plan for the user. That is, the user's accounts are processed in combination to assess the actual financial condition and/or financial behaviors of the user. The method can utilize the same types of analytics performed anonymously on other accounts for users who are similar in situation to the user.

The method can include a step 904 of fine-tuning the investment plan based on data obtained from the plurality of user accounts and the goal to create a goal-based plan that is tailored to the user. For example, based on the deep analytics of the user's accounts, it may be determined that the user can put additional money into retirement by applying spending currently allocated to entertainment expenses into their retirement account. This can be facilitated by ensuring that instruction sets are sent to execute an ACH to transfer funds to their investment account within 12 hours of the user receiving their direct deposit income each month.

In some embodiments, the method includes a step 906 of tracking the plurality of user accounts over time, and a step of 908 generating recommendations to reallocate or adjust the plurality of user accounts based on the tracking relative to the goal. That is, the systems executing the method can periodically assess the user's account to ensure compliance with the goal-based plan.

Next, the method includes a step 910 of presenting the recommendations through the user-facing application, and then a step 912 of transmitting new instruction sets that correspond to the recommendations to one or more third party services that control the plurality of user accounts when the recommendations are approved.

Figure 10:
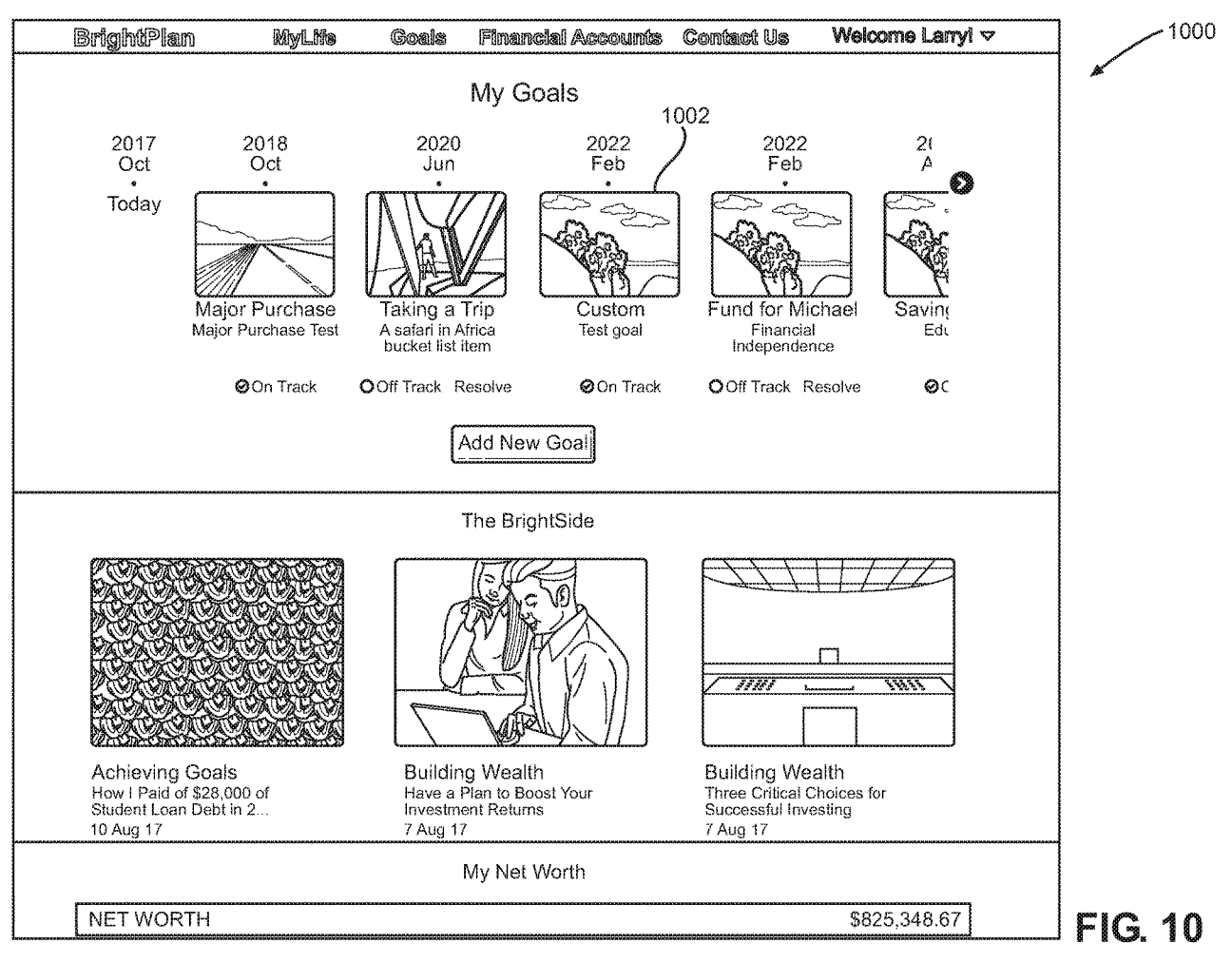

FIG. 10 is an example GUI in the form of an overview dashboard 1000.

The dashboard 1000 provides a user with summary information regarding their financial position, including goals that are displayed in a linear timeline 1002. The goals are indicated as being either on track or off track based on the analysis performed by the systems of the present disclosure, as described above. Educational content suggested for the user is displayed in a lower portion of the dashboard 1000, along with a net worth for the user. As noted above, this net worth is a summary calculation of all of the relevant facets of the finances of the user obtained from their various accounts and processing using the methods described above.

Figure 11:
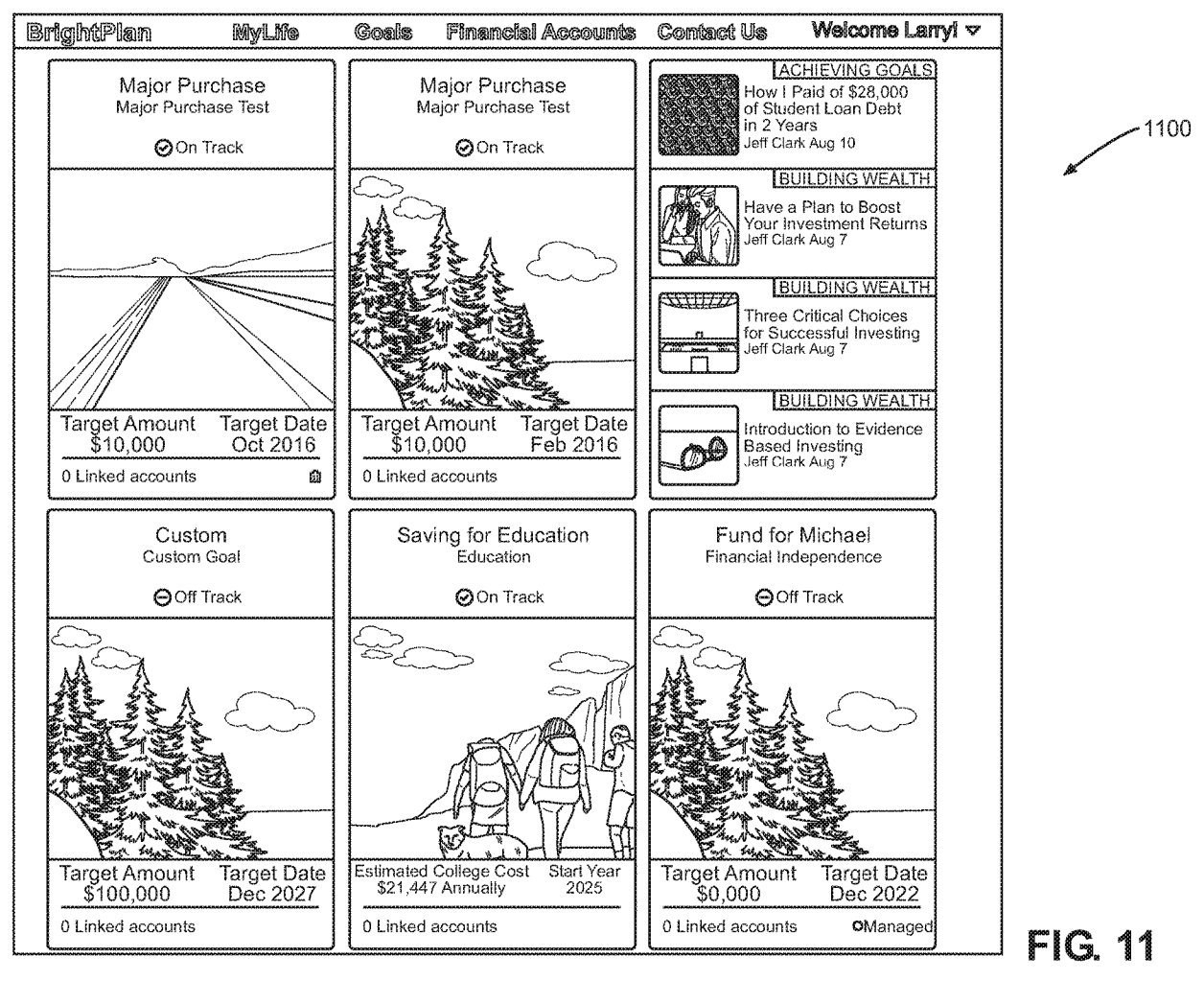

FIG. 11 is another example GUI 1100 that displays goal summaries. These goal summaries are based on goal inputs selected by either the user or the system in an automated manner. Each pane in the GUI 1100 provides a summary of information for a selected goal, including details that are particularly relevant for the goal. For example, in pane 1102, the major purchase goal is presented and provides the user with a target amount to save for this purchase and a target date. Each of the panes is linked to one or more user accounts that are relevant to the goal.

Figure 12:
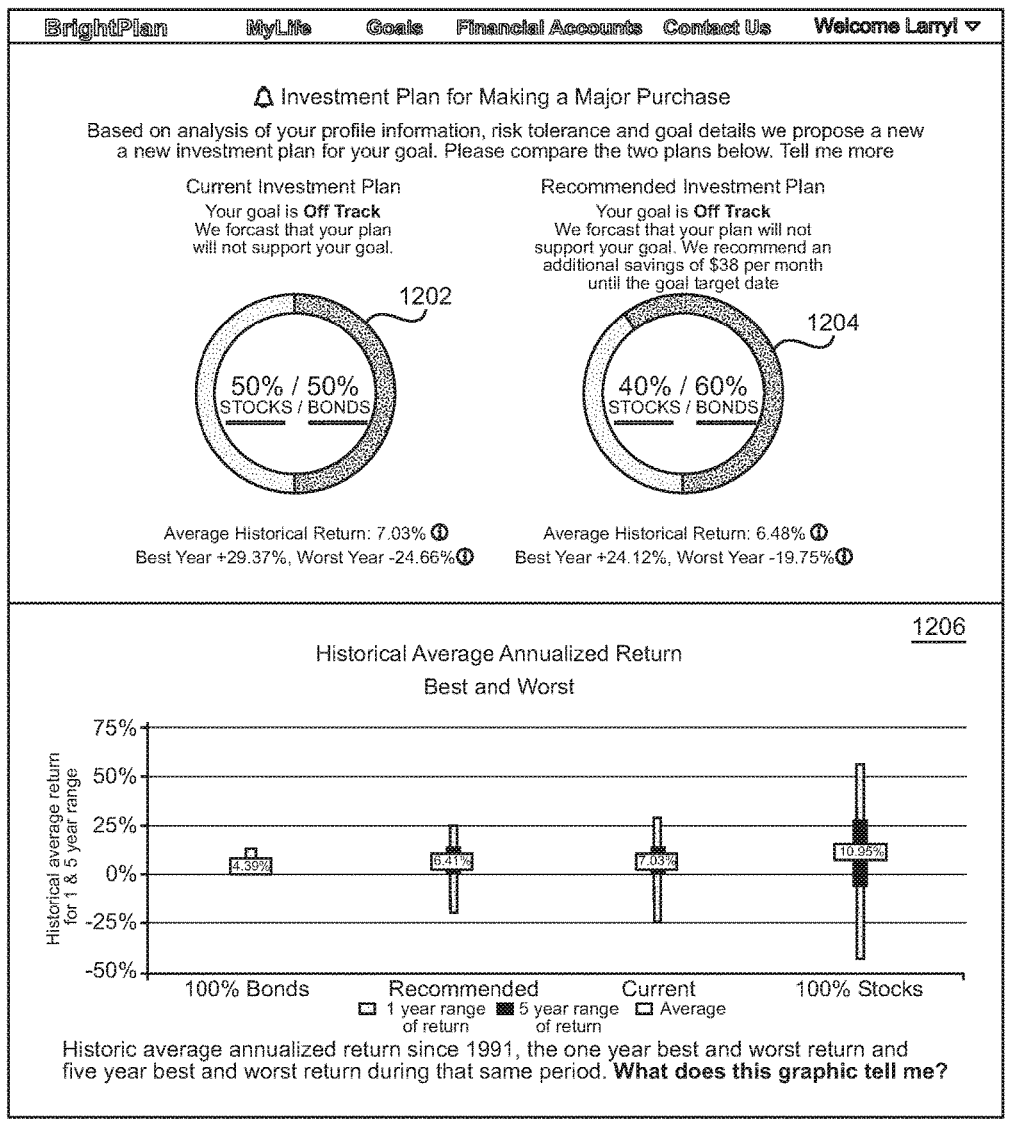
FIG. 12 is a screenshot of a recommended investment plan provided by a user-facing application.

FIG. 12 is another example GUI 1200 that illustrates a recommended investment plan generated in accordance with the present disclosure. The GUI 1200 includes an indicator 1202 that illustrates a current investment plan and a second indicator 1204 that illustrates a proposed investment plan that is intended to remedy an off track goal. The user is further informed about the performance of the proposed investment plan in a section 1206 below the indicators. The user can accept or reject the proposed reallocation from a current investment plan to the proposed investment plan using the buttons below section 1206.

Figure 13:
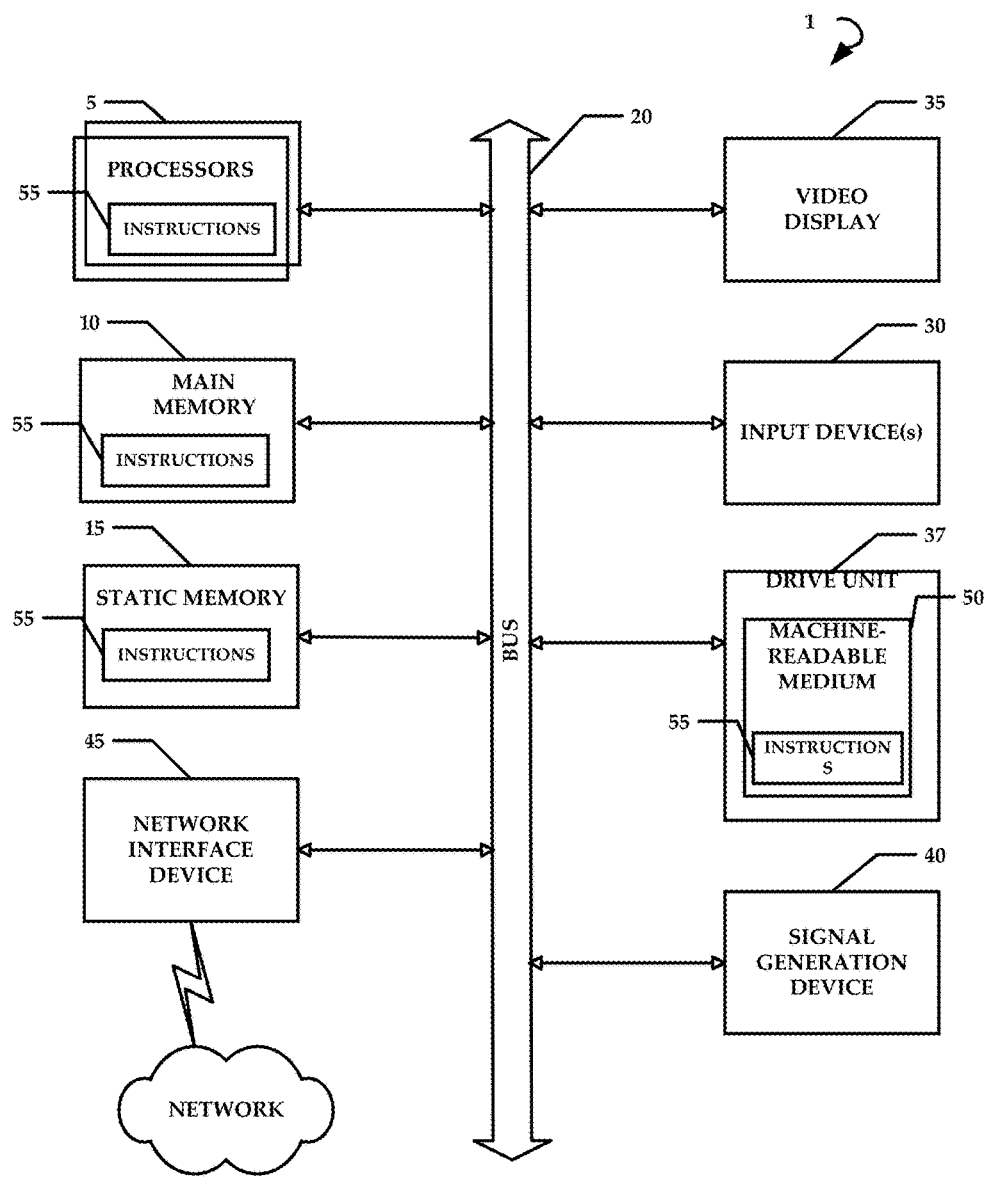
FIG. 13 illustrates an exemplary computing system that may be used to implement embodiments according to the present technology.

FIG. 13 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A secure messaging system, comprising:
    a data retention system and a predictive analytics system, both of which are in secure isolation from a remainder of the secure messaging system;
    a web services layer providing access to the data retention and the predictive analytics systems; and
    an application server layer that:
        provides a user-facing application that accesses the data retention and the predictive analytics systems through the web services layer, the user-facing application being secured through use of a security token cached on a web browser that provides the user-facing application; and
        performs asynchronous processing based on user interaction with a goal-based planning application that processes data from a plurality of user accounts, wherein the goal-based planning application is capable of:
            providing queries that are directed to assessing both risk willingness and goal ability;
            receiving responses to the queries;
            generating a risk willingness score and a goal ability score;
            selecting a goal-based plan based on both the risk willingness score and the goal ability score; and
            generating one or more instructions sets that are used to automatically reconfigure the plurality of user accounts to ensure that a goal is met within a specified time frame.

2. The system according to claim 1, wherein each of the risk willingness score and the goal ability score are weighted.

3. The system according to claim 2, wherein the goal-based planning application is further capable of fine-tuning an investment portfolio based on the plurality of user accounts.

4. The system according to claim 3, wherein the goal-based planning application is further capable of performing deep analytics on the plurality of user accounts and a plurality of anonymized accounts to create the goal-based plan for the user.

5. The system according to claim 4, wherein the goal-based planning application is further capable of:
    analyzing the plurality of user accounts to determine if the plurality of user accounts are compliant with the goal-based plan; and
    automatically generating trade requests to be executed by one or more third party services based on deviations determined during analysis that indicate that the plurality of user accounts are not compliant with the goal-based plan.

6. The system according to claim 5, wherein the goal-based planning application is further capable of suggesting digital content for the user based on the deep analytics of the plurality of user accounts and the goal-based plan.

7. A method, comprising:
    providing, by an application server layer, a user-facing application that accesses a data retention and a predictive analytics systems through a web services layer, the user-facing application being secured through use of a security token cached on a web browser that provides the user-facing application;

establishing, by the application server layer, a security protocol or security token utilized between the application server layer and the web services layer that is different from the security token cached on the web browser; and performing, by the application server layer, asynchronous processing based on user interaction with a goal-based planning application that processes data from a plurality of user accounts, wherein the goal-based planning application is capable of:

providing queries that are directed to assessing both risk willingness and goal ability;

receiving responses to the queries;

generating a risk willingness score and a goal ability score;

selecting a goal-based plan based on both the risk willingness score and the goal ability score; and generating one or more instructions sets that are used to automatically reconfigure the plurality of user accounts to ensure that a goal is met within a specified time frame.

8. The method according to claim 7, wherein selecting a goal-based plan further includes consulting one or more matrices that comprise nodes corresponding to permutations of risk willingness scores and goal ability scores.

9. The method according to claim 8, wherein each of the nodes is associated with a specific goal-based plan that comprises at least a ratio of stocks and bonds.

10. The method according to claim 9, further comprising selectively adjusting the ratio of stocks and bonds as an end of the specified time frame approaches.

11. The method according to claim 7, wherein each of the risk willingness score and the goal ability score are weighted.

12. The method according to claim 11, further comprising fine-tuning an investment portfolio based on the plurality of user accounts.

13. The method according to claim 12, further comprising performing deep analytics on the plurality of user accounts and a plurality of anonymized accounts to create a goal-based plan for the user.

14. The method according to claim 13, further comprising:

analyzing the plurality of user accounts to determine if the plurality of user accounts are compliant with the goal-based plan; and automatically generating trade requests to be executed by one or more third party services based on deviations determined during analysis that indicate that the plurality of user accounts are not compliant with the goal-based plan.

15. The method according to claim 14, further comprising suggesting digital content for the user based on the deep analytics of the plurality of user accounts and the goal-based plan.

16. The method according to claim 7, further comprising:

tracking the plurality of user accounts;

generating recommendations to reallocate or adjust the plurality of user accounts based on the tracking relative to the goal; and presenting the recommendations through the user-facing application.

17. The method according to claim 16, further comprising transmitting new instruction sets that correspond to the recommendations to one or more third party services that control the plurality of user accounts when the recommendations are approved.

* * * * *